3,320,203
SPRAYABLE POLYVINYL BUTYRAL WOOD PRIMER FOR POLYURETHANE OR POLYESTER FINISH
Morton D. Kellert, Longmeadow, Mass., assignor, by mesne assignments, to Monsanto Company, a corporation of Delaware
No Drawing. Filed Apr. 1, 1963, Ser. No. 269,706
1 Claim. (Cl. 260—32.8)

This invention relates to solution of polyvinyl butyral resin which can be used with particular advantage to prime and seal wood surfaces before coating with polyurethane and polyester finishes; more particularly, it relates to solutions of special types of polyvinyl butyral resins in organic solvents which serve these ends without the assistance of other resins.

The new polyurethane and polyester wood finishes possess truly outstanding properties unequalled by any other wood finishing system at comparable cost. These finishes when applied to wood produce high gloss surfaces of excellent appearance and of good aging characteristics. Their resistance to marring, heat, chemicals, water and abrasion is remarkable. The finishes provide the further advantage that satisfactory builds of protective film can be obtained in one application only and that no polishing is required after the film has dried. Yet, in spite of these and other useful properties, the finishes do nevertheless suffer from serious shortcomings.

Of the porblems connected with their use, such as, for instance, limited pot life and difficulty in touching up, this invention concerns itself with the facts that if these finishes be applied directly to unprimed wood surfaces, the polyurethane or the polyester resin may sink badly into the wood and may exert only poor adhesion; on the other hand, even if primer-sealer solution be first applied, the appearance and properties of the polyurethane or polyester topcoat may still be adversely affected by migration of the primer-sealer resin through the topcoat. Furthermore, if no sealer be used, the finishes will darken the wood and the coatings obtained from them will have poor impact resistance, weak solvent resistance and low cold check resistance.

Primer-sealer solutions or emulsions are not new of course. However, those available to date were designed primarily for use in conjunction with finishes other than the polyurethane and polyester finishes of present concern. Aqueous emulsion primers, for instance, including those of polyvinyl butyral as I have found, show the disagreeable property of raising the grain of the wood severely, thereby making it impossible to derive the full benefits potentially associated with polyurethane and polyester finishes. With the organic solvent solution primers of the prior art, on the other hand, one runs into problems of migration of the resin into the topcoats as well as the other problems enumerated earlier.

It must be pointed out that polyvinyl butyral resins are not foreign to the primer-sealer art. Yet, it has been considered heretofore necessary to use these resins in conjunction with other resins, such as nitrocellulose for example. Reportedly, polyvinyl butyral does not spray well: its solutions produce a veiling effect which prevents the application of smooth, uniform coatings. It is also known that polyvinyl butyral resin often does not give satisfactory adhesion when applied by spraying its solutions in that it tends to strip in sheets from the wood or metal covered. These peculiarities are of course valuable where strip coatings are desired but they obviously seriously interfere with the use of this resin in primer-sealer solutions.

It is an object of this invention, therefore, to provide a priming coat that will serve as a satisfactory binding agent between polyurethane and polyester finishes and wood surfaces. Another object is to provide a priming coat that can prevent said finishes from sinking into the wood on which they are coated. Another object is to provide a priming coat that will not migrate into the polyurethane or polyester coating. Still another object is to provide a priming coat that will prevent said finishes from darkening the wood on which they are applied. A further object is the production of priming compositions that can be sprayed, brushed, dipped or applied by any convenient means. Another object is the provision of a priming coat that will substantially improve the impact, solvent and cold check resistance of polyurethane and polyester finishes on wood.

These and other objects which will become evident in the course of the detailed description of the invention have been accomplished by forming solutions of certain polyvinyl butyral resins in mixtures of alcohol and aromatic hydrocarbon solvents, said polyvinyl butyral resins being characterized by an hydroxyl group content of about 9 to 30% by weight, calculated as polyvinyl alcohol, and a molecular weight of about 25,000 to 75,000 (weight average).

The following examples will show specific embodiments of the invention. It is understood that they are given merely as illustrations and that no limitation of the invention is intended thereby beyond those found in the appended claim. All parts and percentages are on a weight basis except when specified otherwise.

*Example 1*

An excellent primer-sealer applicable by brush can be prepared from the following ingredients:

| | Parts by weight |
|---|---|
| Polyvinyl butyral "Butvar B–90" | 12.5 |
| Toluene | 52.5 |
| Proprietary ethyl alcohol (95%) | 35.0 |
| | 100.0 |

"Butvar B–90" is a commercially available polyvinyl butyral resin with a molecular weight of about 41,000 (weight average) and a viscosity of 13 to 18 centipoises at 20° C. as a 6% solution in methanol. The product is a white free-flowing powder containing 18 to 20% hydroxyl, expressed as polyvinyl alcohol, not more than 1% acetate, expressed as polyvinyl acetate, and approximately 80% butyral, expressed as polyvinyl butyral.

*Example 2*

A preferred formulation for a primer-sealer to be applied by spraying is the following one:

| | Parts by weight |
|---|---|
| Polyvinyl butyral "Butvar B–90" | 7.0 |
| Ethylene glycol monoethyl ether | 9.3 |
| Diacetone alcohol | 4.7 |
| n-Butyl alcohol | 13.9 |
| Proprietary ethyl alcohol (95%) | 18.6 |
| Xylene | 27.9 |
| Toluene | 18.6 |
| | 100.0 |

In order to evaluate the performance, each polyvinyl butyral solution was applied to one face of a wood panel by brush or spray gun, as indicated; the coating was allowed to dry in air until tack-free and was then dried further in an air oven at 50° C. for 30 minutes. Panels of half-inch plywood cut in size of 9 by 3 inches were used; care was exercised to select panels with similar grain for each series of tests in order to minimze the effects of the highly variable nature of wood surfaces.

After priming, the panels were lightly sanded with No. 400 fine sandpaper and topcoats were applied with a blade, 8 mils wet thickness for polyurethanes and 5 mils for polyesters. These films needed several days to acquire full hardness.

The polyurethanes employed were typical isocyanate resins. They are the reaction products of polyisocyanates, usually tolylene diisocyanates, with other materials containing more than one hydroxyl group per molecule such as polyols and appropriate polyethers and polyesters. Specific examples of the polyhydric compounds which may be combined with polyisocyanates to form polyurethanes are castor oil, mono- and diglycerides, chemically treated castor oils, propylene oxide and ethylene oxide derivatives and so on. Evidently, many variations of these preparations are possible and are in commercial use. The present tests were conducted with both prepolymer "two package" type finishes, in this case "Spenkel P23–75S Clear Coating" (Spencer Kellogg and Sons, Inc.), and the finished "one package" spar varnishes, in this case "Spenkel F77–60MS Clear Exterior Spar Varnish." The solids concentration in these varnishes was 50% by weight.

The polyester lacquers were also typical in that they belonged to the two-stage polymerization class. Competent descriptions of these products may be found in "Paint Manufacture," February 1960, pp. 49–50, and May 1960, pp. 161–170; these articles by P. M. Fisk and L. H. Allan respectively are hereby incorporated by reference. In short, these resins are the condensation products of dibasic acids with dihydric alcohols. Trifunctional compounds may also be included. If all or part of the acid units of the polymer contain unsaturation, as was the case with the varnishes used here in that the polymer's dibasic acid was maleic acid, then the polyester may be further polymerized after application to a substrate by addition to another monomer in the styrene class, such as styrene, vinyl toluene, and so on, in the presence of a conventional peroxide catalyst. Again, as with the polyurethane finishes, many variations are possible and commercially available. The products used here were "two package" systems which after mixing had a total potential solids content of 100% by weight and a pot life of 15 to 30 minutes. One product was "Polylite 8703 Gloss Clear Top Coat" (Reichhold Chemicals, Inc.) using vinyl toluene and the other was "Roskydal 500 Clear Varnish" (Farbenfabriken Bayer) using styrene.

After priming and varnishing, the panels were tested for adhesion, solvent resistance and cold check. The gloss and appearance of the finished panels were also noted. Impact tests were made on some panels.

To evaluate appearance, the coatings were examined and compared for sinking into the grain of the wood, striations along the grain, irregularities, waviness and "orange peel" effect. The top appearance of the top coat was used as the primary criterion to determine the efficacy of the primer since many primer preparations were good in all respects except topcoat appearance.

Gloss was measured with the gloss meter 60° unit, with standard black glass adjusted to give a reading of 96. Five readings were taken and averaged for each panel.

Adhesion was estimated by making cross hatches through the coating at distances of 5 mm. with a razor blade. Cellophane tape was then applied firmly over the cross hatched area and pulled off with a rapid motion.

Solvent resistance was measured by trapping ethanol (Synasol, 95%) under glass on the surface and edge of the topcoat for sixteen hours. Whiteness, blistering or loosening was then noted.

For cold check, panels were subjected to a temperature of −29° C. in Dry Ice cabinet for one hour, removed to room temperature for one hour and then placed in a circulating oven at 50° C. for one hour. The cycle was repeated up to 25 times, the coatings being examined for cracking after each cycle. The first crack over 5 cm. in length and the first crack through the full length of the coating were recorded in terms of the number of the cycle during which they occurred.

Impact tests were performed by dropping a 904 g. round tip rod through a distance of 30 mm. onto the coating on the wood panel. Polyester topcoats were protected by four thicknesses of paper towelling to avoid 100% failures. The proportion of coating failures to total trials was recorded.

The results of these tests on primed wood panels topcoated with polyurethane and polyester are given in the following tables. These results are reported with the aid of the following scale: outstanding, 10; excellent, 9; very good, 8; good, 7; fair, 6–4; poor, 3; very poor, 2–1. Gloss is given as meter reading, with standard black glass set at 96. Impact resistance is reported as the number of blows out of ten which did not fracture the coating. Performances of panels prepared without primer and with nitrocelluluose primer are included for comparison since such primers have been used commercially under polyester coatings while polyurethane coatings are generally self-primed.

TABLE I.—POLYURETHANE PERFORMANCE OVER DIFFERENT SEALER TYPES

| Sealer Polyvinyl butyral | Overall Appearance | Gloss | Adhesion | Solvent Resistance | Impact Resistance |
|---|---|---|---|---|---|
| Butvar B-76 | 9 | 96 | 9 | 9 | 8 |
| Butvar B-73 | 9 | 92 | 9 | 9 | 7 |
| Butvar B-90 | 9 | 97 | 9 | 9 | 9 |
| Butvar B-98 | 8 | 94 | 9 | 8 | |
| No primer | 1 | 83 | 7 | 9 | |

The difference in the performance of polyurethane finishes with and without primer treatment is remarkable, especially in appearance of finished wood surfaces, a consideration of great importance for the commercial success of these products. It should be noted also that the four types of polyvinyl butyrals employed function equally well with polyurethane finishes. "Butvar B–90" polyvinyl butyral has already been identified. The three other types possess the following characteristics: molecular weight (weight average) B–73, 64,000; B–76, 50,000; and B–98, 32,000. Similarly, the minimum and maximum hydroxyl group contents of each type, given in percent polyvinyl alcohol content, is 17.5–21, 9–13 and 18–20, respectively. Viscosities of 10% resin solutions in 95% ethyl alcohol at 25°C. are 400, 175 and 75 centipoises. Primers prepared with these polyvinyl butyral resins contained the same solvents that were used with "Butvar B–90" polyvinyl butyral in the examples, the type of solvent and the solids content of such primer solutions varying of course in accordance with the different viscosities of these resins and with the method of application contemplated.

TABLE II.—POLYESTER PERFORMANCE OVER DIFFERENT SEALER TYPES

| Sealer | Overall Appearance | Gloss | Adhesion | Impact Resistance | Cold Check Endurance |
|---|---|---|---|---|---|
| Butvar B-90 | 9-7 | 96 | 9 | 9 | 9 |
| Nitrocellulose | 10 | 95 | 2 | 2 | 2 |
| No primer | 1 | 78 | 3 | 2 | 4 |

Again the overall superiority of polyvinyl butyral as a primer material for polyester wood finishes is evident, especially in adhesion and in cold check endurance.

The polyvinyl butyral resins that can be used in the solutions of this invention are prepared from hydrolyzed polyvinyl esters by conventional methods. In general, they are white, free-flowing powders having a weight average molecular weight within the range of 25,000 to 75,000, an hydroxyl group content of 9 to 30% by weight, calculated as polyvinyl alcohol a butyral content of about 70 to 90% by weight, calculated as polyvinyl butyral and a viscosity ranging from 50 to 1000 centipoises as 10% by weight solutions in 95% ethyl alcohol at 25° C. The preferred types of polyvinyl butyrals for overall excellence of properties with both polyurethane and polyester wood finishes are those with a molecular weight within the range of 35,000 to 50,000, a polyvinyl alcohol content of 17.5 to 21% and a 10% ethyl alcohol room temperature viscosity of 125 to 275 centipoises.

The solvents which can be employed to prepare the solutions include mixtures of aromatic hydrocarbon liquids with aliphatic alcohol and ketones. Examples of usable liquids are xylene, toluene, benzene, ethyl alcohol, acetone, n-butyl alcohol, cyclohexanone, diacetone alcohol, ethyl acetate, ethyl Cellosolve, methyl acetate, methyl butanol, isopropyl alcohol.

The actual composition of any particular composition will depend on the method of application contemplated for the primer, as shown in the examples, as well as on the inherent viscosity of the grade of resin selected. This inherent viscosity is of course related to the molecular weight and to the hydroxyl group content of the polyvinyl butyral. Within these limits of usable substances, the nature and amount of solvents selected will be further influenced by the appearance of a polyurethane or polyester topcoat on a surface primed wtih the polyvinyl butyral solution.

The priming solutions of this invention may contain from about 4 to about 20% solids by weight, the preferred concentrations being about 12% polyvinyl butyral by weight for brush application of the preferred types of resins and about 7% for spray application.

It is apparent that many widely different embodiments of the invention may be made by persons skilled in the art without departing from its spirit and scope and it is not intended therefore that it be limited except as indicated in the claim:

What is claimed is:

A sprayable priming composition for polyester and polyurethane wood finishes consisting of the following formulation:

| | Parts by weight |
|---|---|
| Polyvinyl butyral | 7.0 |
| Ethylene glycol monoethyl ether | 9.3 |
| Diacetone alcohol | 4.7 |
| n-Butyl alcohol | 13.9 |
| Proprietary ethyl alcohol (95%) | 18.6 |
| Xylene | 27.9 |
| Toluene | 18.6 |
| Total | 100.0 | wherein the polyvinyl butyral has a molecular weight range of 35,000 to 50,000, a polyvinyl alcohol content of 17.5 to 21%, a residual acetate content of less than 3.0%, and a 10% ethyl alcohol solution viscosity of 125 to 275 centipoises at 25° C.

References Cited by the Examiner

UNITED STATES PATENTS

| 2,162,680 | 6/1939 | Robertson | 260—73 |
| 2,405,983 | 8/1946 | Sharky et al. | 260—73 |
| 2,410,414 | 11/1946 | Johnson | 260—73 |
| 2,469,320 | 5/1949 | Swan | 260—73 |
| 2,471,497 | 5/1949 | Roberts et al. | 260—73 |
| 2,682,520 | 6/1954 | Bump et al. | 260—73 |

OTHER REFERENCES

Smith: "Vinyl Resins," Reinhold 1958, p. 168.

ALEXANDER H. BRODMERKEL, *Primary Examiner.*

MORRIS LIEBMAN, *Examiner.*

A. H. KOECKERT, *Assistant Examiner.*